United States Patent
Beard, III et al.

[11] Patent Number: 5,393,064
[45] Date of Patent: Feb. 28, 1995

[54] APPARATUS AND METHOD FOR DETERMINING PROJECTILE IMPACT LOCATIONS

[76] Inventors: Bryce P. Beard, III, 1617 Emerald St., Salisbury, N.C. 28144; James W. Kluttz, 709 Arbor Rd.; Edgar P. Roberts, Jr., 761 Westover Ave., both of Winston-Salem, N.C. 27104

[21] Appl. No.: 692,223

[22] Filed: Apr. 26, 1991

Related U.S. Application Data

[62] Division of Ser. No. 474,363, Feb. 2, 1990, Pat. No. 5,029,888, which is a division of Ser. No. 208,673, Jun. 20, 1988, Pat. No. 4,898,388.

[51] Int. Cl.$^6$ .......................... A63B 69/36; F41J 5/00
[52] U.S. Cl. .................. 273/181 R; 273/181 G; 273/185 R; 273/176 A
[58] Field of Search ............... 273/32 R, 32 H, 35 R, 273/176 B, 181 R, 181 C, 181 G, 185 R, 185 A, 185 B, 348, 371, 372, 411, 31, 29 R, 29 A, 35 B, 176 A

[56] References Cited

U.S. PATENT DOCUMENTS

| | | | |
|---|---|---|---|
| 2,054,604 | 9/1936 | Pence | 177/384 |
| 2,331,236 | 10/1943 | Schaefer | 273/181 C |
| 2,557,550 | 6/1957 | Leaver et al. | 273/181 C |
| 2,743,929 | 5/1956 | Smith | 273/184 R X |
| 2,784,000 | 3/1957 | Simjian | 273/181 C |
| 3,310,310 | 3/1967 | McKee | 273/181 R |
| 3,508,440 | 4/1970 | Murphy | 273/181 G |
| 3,633,007 | 1/1972 | Sanders | 235/151 |
| 3,643,959 | 2/1972 | Cornell et al. | 273/176 FA |
| 3,678,495 | 7/1972 | Gilbert | 273/372 |
| 3,707,699 | 12/1972 | Sanctuary | 273/372 |
| 3,778,059 | 12/1973 | Rohrbaugh et al. | 273/372 |
| 3,793,481 | 2/1974 | Ripley et al. | 178/6.8 |
| 3,814,438 | 6/1974 | Baron et al. | 273/176 FA |
| 3,857,022 | 12/1974 | Rebane et al. | 273/185 R |
| 3,897,947 | 8/1975 | Heffley | 273/195 R |
| 3,922,663 | 11/1975 | Lubke | 367/136 |
| 4,006,907 | 2/1977 | Heffley, Jr. | 273/185 A |
| 4,009,883 | 3/1977 | Yellowlees et al. | 273/181 C |
| 4,062,008 | 12/1977 | Carlsson | 340/323 R |
| 4,063,738 | 12/1977 | Michalson | 273/176 A |
| 4,086,630 | 4/1978 | Speiser et al. | 273/176 L |
| 4,088,324 | 5/1978 | Farmer | 273/186 A |
| 4,136,387 | 1/1979 | Sullivan et al. | 273/185 R X |
| 4,136,394 | 1/1979 | Jones et al. | 364/561 |
| 4,223,304 | 9/1980 | Barowitz | 367/136 |
| 4,259,688 | 3/1981 | Tokuhara et al. | 358/107 |
| 4,305,142 | 12/1981 | Springer | 367/127 |
| 4,322,828 | 3/1982 | Hoff et al. | 367/118 |
| 4,333,106 | 6/1982 | Lowe | 358/107 |
| 4,336,939 | 6/1982 | Krumlauf | 273/185 R |
| 4,409,473 | 10/1983 | Furuta | 250/206 |
| 4,515,365 | 5/1985 | Horikoshi et al. | 273/25 |
| 4,545,576 | 10/1985 | Harris | 273/25 |
| 4,601,053 | 7/1986 | Gramet | 382/1 |
| 4,673,183 | 6/1987 | Trahan | 273/176 |
| 4,673,183 | 6/1987 | Trahan | 273/176 A |
| 4,847,817 | 7/1989 | Au et al. | 367/87 |
| 4,855,711 | 8/1989 | Harrop et al. | 340/323 R |
| 4,898,388 | 2/1990 | Beard, III et al. | 273/181 R |
| 5,029,866 | 7/1991 | Beard, III et al. | 273/181 R |

FOREIGN PATENT DOCUMENTS

| | | | |
|---|---|---|---|
| 3607312 | 9/1986 | Germany | 273/372 |
| 3528075 | 2/1987 | Germany | 273/372 |
| 3603540 | 8/1987 | Germany | 273/372 |
| 2152663 | 8/1985 | United Kingdom . | |
| 8603284 | 6/1986 | WIPO . | |
| 8705706 | 9/1987 | WIPO . | |

*Primary Examiner*—Jessica J. Harrison
*Attorney, Agent, or Firm*—Rhodes, Coats & Bennett

[57] ABSTRACT

This invention relates to an apparatus and method for determining projectile impact locations and, in a specific application, to determining a golfer's performance in using a particular club, such as a specific iron. The apparatus has an array of a plurality of vibration sensors distributed in a predetermined pattern in a target area, each of which generates a signal indicative of the sensing of vibration, a processor connected for receiving sensor signals generated and for processing received sensor signals for determining a location of projectile impact relative to the locations of sensors in the target area and for generating an electrical location signal, and a display connected with the processor for receiving the location signal and for displaying to an observer a representation of the location of projectile impact in the target area.

2 Claims, 3 Drawing Sheets

Name: John Smith
Date: 01-06-1988
Temperature: 56
Club: 6 iron
Nominal Range (yds): 145
GROUP STATISTICS

|  |  | Median | Mean | Stan Dev |  |
|---|---|---|---|---|---|
| Range | 145 yds | 143.50 | 144.45 | 12.58 | yds |
| Width |  |  | 0.11 | 13.47 | yds (- means left, + means right) |

<-- SHORT    LONG -->
Yards

Ball Geography

145

FROM TEE

APPARATUS AND METHOD FOR DETERMINING PROJECTILE IMPACT LOCATIONS

This application is a division of application Ser. No. 07/474,363, filed Feb. 2, 1990, now U.S. Pat. No. 5,029,888, issued Jul. 9, 1991, which is a division of application Ser. No. 07/208,673, filed Jun. 20, 1988, now U.S. Pat. No. 4,898,388, issued Feb. 6, 1990.

FIELD AND BACKGROUND OF INVENTION

This invention relates to an apparatus and method for determining projectile impact locations and, in a specific application, to determining a golfer's performance in using a particular club, such as a specific iron.

The location or impact or a projectile is of interest in a number or different fields, from military to sports, and may include such subjects as range determination for firearms and for sports projectiles such as golf balls and the like. Various apparatus and methods have been proposed heretofore to determining locations of impact and for providing information about such locations to an interested user, from an artillery range officer to a ball player or golfer. Examples may be found in such prior patents as Pence U.S. Pat. No. 2,054,604; Smith U.S. Pat. No. 2,743,929; and Cornell U.S. Pat. No. 3,643,959.

None of these prior patents provide information in a manner which is particularly helpful to the skilled person attempting to improve existing skills by having better knowledge of exactly what performance can reasonably be anticipated. Particularly with a golfer, knowledge of the statistically best choice of club for achieving a particular yardage may open the possibility of a significant improvement in the golfer's game. However, such information has essentially been unavailable to golfers prior to the present invention, inasmuch as range information (that is, the distance of impact location from the tee or point of striking the ball) is extremely difficult to derive with any accuracy from driving range practice.

BRIEF DESCRIPTION OF INVENTION

With the foregoing in mind, it is an object of this invention to provide an interested person with accurate information about the location of impact of a projectile. In realizing this object, vibration sensors are distributed through a target area and signals are gathered from the sensors and processed to determine the location of impact. Data regarding the location of impact of a plurality of projectiles are gathered and analyzed statistically to generate an Output to a user which is useful in learning the range and distribution of the impacts.

Another object of this invention is to equip a golf driving range with an instrument which is capable of assisting a golfer seeking to improve golf skills by providing greater knowledge about range achieved with a particular club and the statistical distribution of shots around a target range. In realizing this object of the present invention, vibration sensors arranged in a geometric array on the surface of or embedded in a golf driving range are polled on a continuing basis by a data processing computer, and sensed vibrations are distinguished to locate the point of impact of a golf ball. Data regarding the locations of impact are then accumulated over time and analyzed to provide a statistical analysis of an individual golfer's performance.

Yet another object of this invention is to provide a training exercise for a golfer in accordance with a method in which locations of impact of golf balls are sensed by the sound of impact, the location is determined by a triangulation process, and the data developed from a series of impacts are analyzed statistically to generate a report valuable to a skilled golfer seeking to improve golfing skills.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying Figures, the present invention will be described with particular reference to its application as a golf training and teaching tool. However, the person skilled in other projectile ranging applications, such as military or other sports applications, will be readily able to envision applications of the invention to be described in such other fields, and thus the following description is to be understood as contemplating such broader applications.

Figure 1:
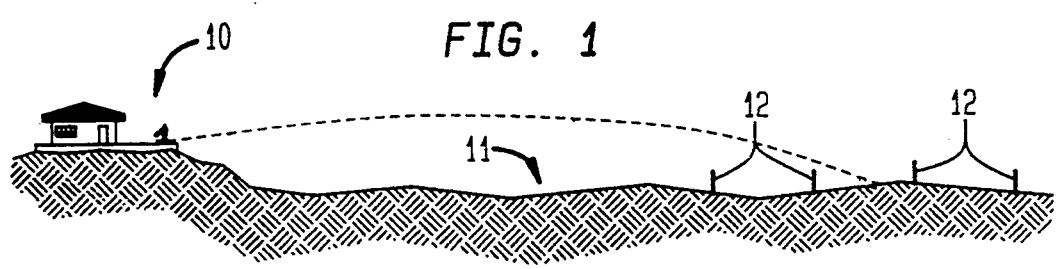
FIG. 1 is a somewhat schematic view of a golf driving range incorporating the present invention.

The apparatus of the present invention is used in conjunction with a suitable driving range or the like, such as that shown in FIG. 1. Such ranges typically have a tee area 10 from which golf balls are struck and a relatively open target area 11 into which balls are hit. In accordance with this invention, an array or a plurality of vibration sensors 12 are distributed in a predetermined pattern in the target area 11, each of the sensors for generating an electrical sensor signal indicative of the sensing of vibration. In a preferred form for the invention and where a permanent installation is to be made, the sensors 12 respond to audible vibrations of sound, and may thus be in the form of microphones, embedded or buried in the ground of the target area 11. Where an installation is to be portable, surface mounted microphones may be used.

Figure 2:
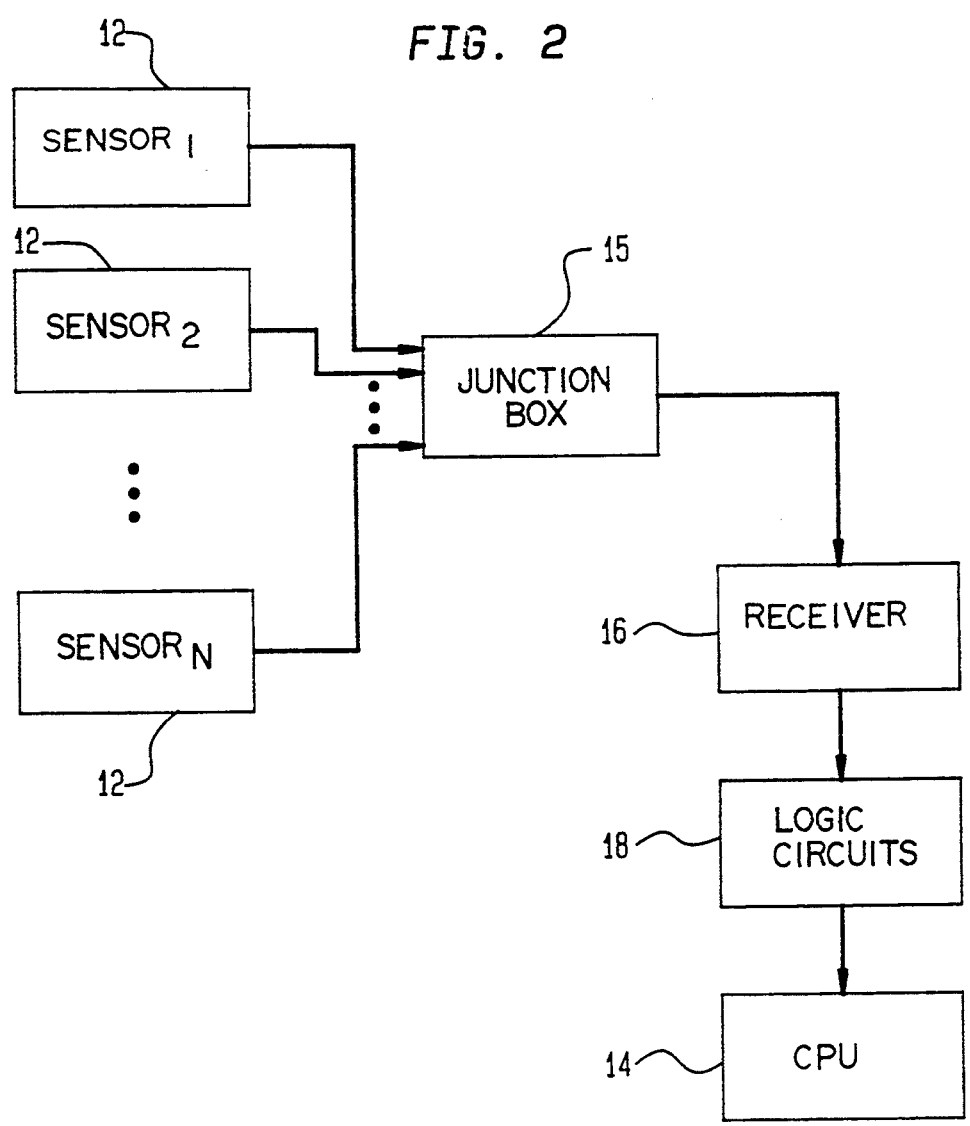
FIG. 2 is a block diagram representation of the apparatus of this invention.

In accordance with important features of this invention, an electrical processor (14 in FIG. 2) is electrically connected with the sensors 11 for receiving sensor signals generated thereby; processing received sensor signals for determining a location of projectile impact relative to the locations of the sensors in the target area; and generating an electrical location signal. The processor preferably takes the form of a microcomputer using, for example only, an 80386 CPU chip and capable of operating at a clock speed on the order of 16 megahertz or more, for reasons which will become more clear hereafter. Before reaching the processor, the sensor signals may be filtered, preamplified, and passed through certain detection and threshold circuits as will be described hereinafter.

Figure 3:
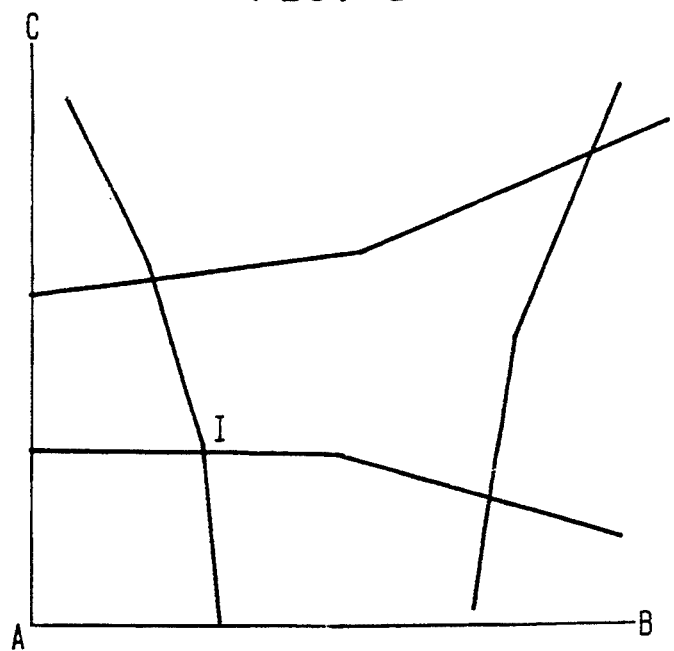
FIG. 3 is a diagram illustrating the manner in which a position of impact is determined from vibration data derived from a plurality of sensors.

The processor operates to determine the location of ball impact by a process of triangulation using signals from a plurality of sensors. More particularly, and referring to FIG. 3, comparing the time of arrival of the sound of an impact at a pair of sensors (such as sensors located at points A and B in the Figure) permits determination of a hyperbola on which the ball landed, such as the two hyperbolic arms which extend somewhat vertically in FIG. 3. Here three sensors are used, two hyperbola result from the determination, and the ball is located as having landed at the intersection of the hyperbolic arms. While two such intersections are possible (see FIG. 3), the relative times of sensing will enable a discrimination of which intersection is in fact closer to the common sensor, thereby definitely locating the ball impact at the point I.

It has been determined that golf ball impact sounds have certain characteristics which are employed to advantage in the present invention. More particularly, the sound of impact varies somewhat with ground conditions. However, such sounds have been reliably detected when impact occurred within twenty-five yards of a microphone. Over a range of ground conditions, the frequency of the sound of impact falls within a band width of from about 600 hz to about 1400 hz.

Figure 4:
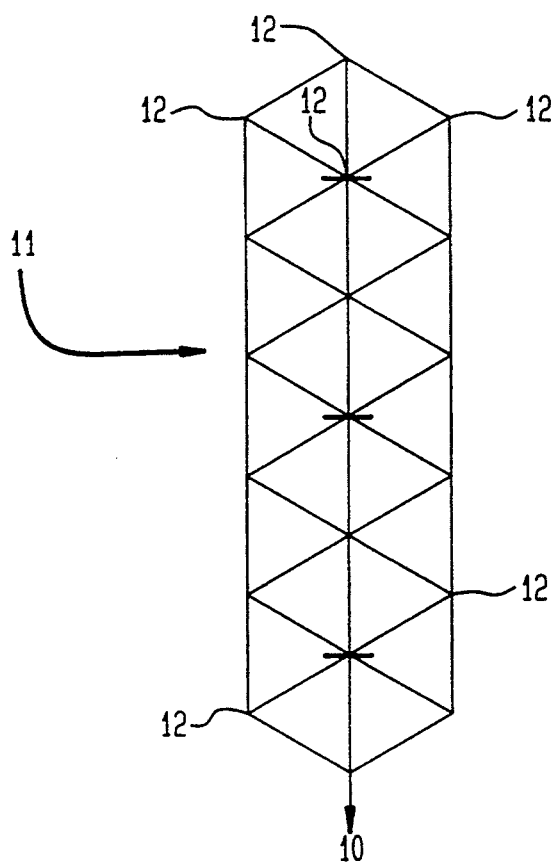
FIG. 4 is a schematic plan view of a target area such as that of the driving range of FIG. 1, illustrating the installation of a plurality of sensors in a geometric array.

In accordance with the present invention, sensors are distributed over a horizontal target area (such as a golf driving range) in a predetermined geometrical array. The use of an array is chosen to enable coverage of a target area consistent with that in which balls will be landing, that is, generally an elongate, rectangular area. In order to provide a pattern of sensors which is easily rationizable for data processing, provides reliable detection of impact, and is easily expanded or contracted to fit varying areas, the geometric array is preferably chosen to include a number of triangles, arranged in hexagons. Such a hexagon array (shown in plan view in FIG. 4) has the capability of sensing ball landings over an extended range and being easily expandable widthwise to cover enlarged areas if desired.

In arranging the apparatus of this invention, it is preferred that each sensor or microphone 11 have an associated filter and preamplifier to limit the signals forwarded to the desired bandwidth and provide some boost in signal levels. Such sensor units may be joined through junction boxes 15 (FIG. 2) to one or more receivers 16 which provide further amplification and then to logic circuits 18 which perform certain preliminary logic steps. For example, it is desirable to screen out of the signals to be processed by the microprocessor 14 randomly or slowly fluctuating background noise, which for present purposes is any signal which has a rise time significantly less than that of a ball impact sound, such as a passing automobile, wind, etc. In an operating embodiment of the invention, such screening was accomplished by use of a comparator having a settable threshold which must be exceeded for signal passage and which makes an ongoing comparison of signals to separate detection of a sharply rising signal from detection of a more slowly rising signal and discard the latter. The logic circuits may also include timing circuits which respond to the first sensor signal of impact by opening a window of time in which second and third sensor signals of impact will be sought in order that the discrimination of impact location may be performed.

The processor 14 has associated memory for storing a plurality of location signals and functions for compiling and comparing sets of location signals indicative of the impacts of a succession of projectiles. In particular, the processor 14 performs a statistical analysis of a set of location signals for developing a teaching aid for a golfer which will clarify for the golfer the performance actually accomplished with specific clubs. The processor 14 performs an analysis of a set of location signals for determining the distribution of the signals in the set about a predetermined location, and preferably in distance from a predetermined location along a predetermined axis, such as in yards from the tee 10.

Figure 5:
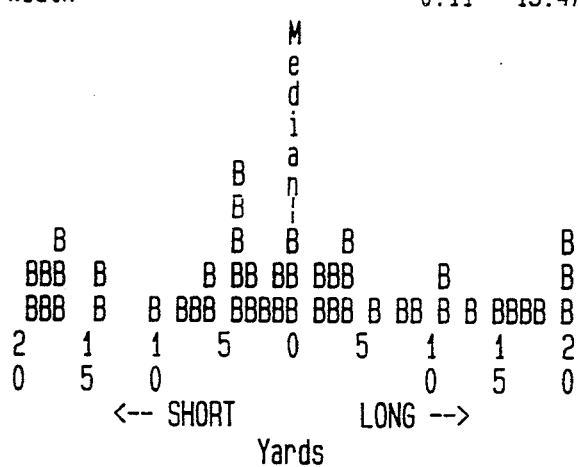
FIG. 5 is a representation of a form of statistical report generated in accordance with the method of this invention.
Figure 5:
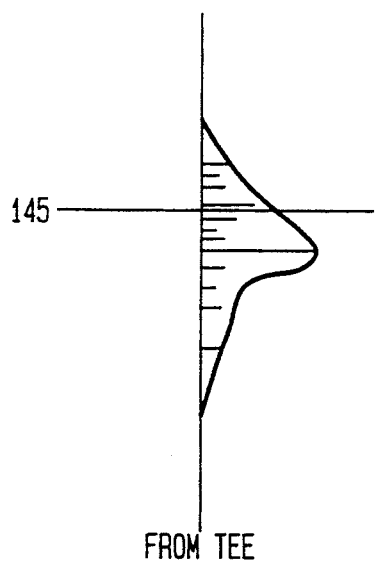

The statistical data generated and stored by the processor 14 is supplied, in the form of an electrical signal, to a display which is electrically connected with the processor for receiving a location signal and for displaying to an observer a representation of the location of projectile impact in the target area. One example of such a representation is illustrated in FIG. 5, in a form which may either appear as a visual display on a visual display device such as a CRT or LCD display or be printed out by a suitably driven printer device. The display may include identifying data for the user, date and other conditions such a club used and then present data regarding the normal range for the club used and the distribution of impacts or landings from or about that range. A particularly useful display is a curve of best fit, shown in the lower portion of FIG. 5, for the data, which will graphically illustrate for a golfer the "high percentage" shot for the club undergoing evaluation.

As will be appreciated by the thoughtful reader, the practice of the method of this invention will include the steps of generating a plurality of electrical signals indicative of the sending or vibration affecting an array of a plurality of vibration sensors distributed in a predetermined pattern in a target area; receiving the sensor signals at an electrical processor and processing received sensor signals for determining a location or projectile impact relative to the locations or the sensors in the target area and for generating an electrical location signal; and displaying to an observer a representation of the location of projectile impact in the target area. The signals generated may be generated in response to air borne or ground transmitted vibration, which may be in an audible range of frequencies. The method will include the step of distributing sensors through the target area in a pattern which is a geometric array and the step of storing a plurality of location signals in a set and compiling and comparing sets of location signals indicative of the impacts of a succession of projectiles. A statistical analysis of a set of location signals is performed to provide insight for the user in the performance monitored by the process, preferably by determining the distribution of the signals in the set about a predetermined location.

In the drawings and specifications there has been set forth a preferred embodiment of the invention and, although specific terms are used, the description thus given uses terminology in a generic and descriptive sense only and not for purposes of limitation.

What is claimed is:

1. An apparatus for detecting the range from an origin and lateral displacement from a predetermined axis of the landing location of a golf ball on a golf driving range comprising:
    a) a first sensor located proximate the driving range for generating a first signal indicative of one aspect of the landing location with respect to said first sensor;
    b) a second sensor located proximate the driving range for generating a second signal indicative of the same aspect of the landing location with respect to said second sensor;
    c) said aspect is time of travel of vibrations caused by landing of the golf ball at a moment of impact;
    d) an initiation means for starting a time measurement at a prescribed time with respect to the moment of impact of said golf ball;
    e) processor means for said first and second signals to generate a third signal indicative of said range and said lateral displacement
    f) said first and second sensors are placed at predetermined points with respect to each other and with respect to said initiation means;
    g) said processor measures any time lag between starting said time measurement and the time the first and second sensor senses said impact; and
    h) said processor means determines the impact point by triangulation.

2. Process for detecting the range from an origin and lateral displacement from a predetermined axis of the landing location of a golf ball on a golf driving range comprising the steps of:
    a) sensing at a first sensing location proximate the driving range and remote from the landing location and generating a first signal indicative of one aspect of the landing location;
    b) sensing at a second sensing location proximate the driving range and remote from the landing location and generating a second signal indicative of the same aspect of the landing location;
    c) said aspect being the time of travel of vibrations caused by landing of the golf ball at a moment of impact;
    d) initiating a timing measurement at an initial location and at a prescribed time with respect to the moment of impact of the golf ball on the driving range;
    e) sensing the impact with the first and second sensors at the first and second sensing locations placed at predetermined locations with respect to each other and the initial location;
    f) measuring the time lag between said initiating and the time the impact is sensed at said first and second locations;
    g) processing said first and second signals mathematically by triangulation to generate a third signal indicative of the range and lateral displacement.

* * * * *